United States Patent
Yoshida

(10) Patent No.: US 7,753,449 B2
(45) Date of Patent: Jul. 13, 2010

(54) RECLINING SEAT FOR AUTOMOBILES

(75) Inventor: Masami Yoshida, Takanezawa-machi (JP)

(73) Assignee: TS TECH Co., Ltd., Saitama (JP)

( * ) Notice: Subject to any disclaimer, the term of this patent is extended or adjusted under 35 U.S.C. 154(b) by 323 days.

(21) Appl. No.: 11/908,311

(22) PCT Filed: Mar. 17, 2006

(86) PCT No.: PCT/JP2006/305902
§ 371 (c)(1),
(2), (4) Date: Oct. 10, 2007

(87) PCT Pub. No.: WO2006/098521
PCT Pub. Date: Sep. 21, 2006

(65) Prior Publication Data
US 2009/0026824 A1    Jan. 29, 2009

(30) Foreign Application Priority Data
Mar. 17, 2005   (JP) .............................. 2005-076988

(51) Int. Cl.
*B60N 2/22* (2006.01)
(52) U.S. Cl. .............................. 297/354.13; 297/378.1; 297/378.12
(58) Field of Classification Search ............ 297/354.12, 297/354.13, 373, 378.12
See application file for complete search history.

(56) References Cited

U.S. PATENT DOCUMENTS

| | | | | |
|---|---|---|---|---|
| 1,677,434 A | * | 7/1928 | Dorton | 297/364 |
| 3,051,526 A | * | 8/1962 | Werner et al. | 297/367 R |
| 3,271,811 A | * | 9/1966 | Flodell | 297/373 |
| 3,342,527 A | * | 9/1967 | Bencene | 297/378.12 |
| 3,361,473 A | * | 1/1968 | Dudouyt | 297/373 |
| 3,362,747 A | * | 1/1968 | Fuelling et al. | 297/373 |
| 3,788,698 A | * | 1/1974 | Perkins | 297/373 |
| 4,318,568 A | * | 3/1982 | Ericsson | 297/354.1 |

(Continued)

FOREIGN PATENT DOCUMENTS

JP    11-253259    9/1999

*Primary Examiner*—Peter R. Brown
(74) *Attorney, Agent, or Firm*—Shoemaker and Mattare

(57) ABSTRACT

A reclining seat for an automobile is disclosed. The reclining seat includes a seat back 1 having first side brackets 10 provided at both sides thereof, a seat cushion 2 having second side brackets 11 provided at both sides thereof, the second side brackets 11 being arranged outside of the first side brackets 10 so as to be opposite to the first side brackets 10, a connecting shaft 12 inserted at both end portions thereof through the first and second side brackets and interconnecting the first and second side brackets, whereby the seat back 1 pivotally supported to the seat cushion 2, recliner devices 13 mounted on the connecting shaft 12 and arranged between the first and second side brackets 10, 11 for allowing the seat back 1 to be pivoted forward and rearward relative to the seat cushion 2 in such a manner that an angle of the seat back 1 relative to the seat cushion 2 can be adjusted, and allowing the seat back 1 to be locked with respect to the seat cushion 2, and stopper mechanisms 15 on the first and second brackets 10, 11 for causing a rearward reclined posture of the seat back 1 to be maintained in a full-flat state when the seat back 1 is pivoted rearward relative to the seat cushion 2.

1 Claim, 3 Drawing Sheets

U.S. PATENT DOCUMENTS 6,568,699 B2 * 5/2003 McCann ................ 297/354.13
6,682,137 B2 * 1/2004 Hsia ...................... 297/354.13
2006/0061180 A1 * 3/2006 Scheurer et al. ........ 297/354.13

* cited by examiner

RECLINING SEAT FOR AUTOMOBILES

TECHNICAL FIELD

The present invention relates to a reclining seat for an automobile, which comprises a seat cushion and a seat back supported through recliner devices to a rear portion of the seat cushion so as to be pivoted forward and rearward relative to the seat cushion in such a manner that an angle of the seat back relative to the seat cushion can be adjusted.

BACKGROUND ART

Generally, in a reclining seat for an automobile, side brackets of a seat back of the reclining seat are opposed to side brackets of a seat cushion of the reclining seat and coupled to the side brackets of the seat cushion by a connecting shaft, and recliner devices are mounted on the connecting shaft and arranged between the side brackets of the seat back and the side brackets of the seat cushion, whereby the seat back is pivotally supported to the seat cushion so as to be pivoted forward and rearward relative to the seat cushion in such a manner that an angle of the seat back relative to the seat cushion can be adjusted.

In the automobile seat constructed as discussed above, when the recliner devices are unlocked, the seat back can be pivoted forward so as to be laid on the seat cushion and can be pivoted rearward toward a seat cushion of a rear seat or a second seat arranged rearward of the seat. In particular, when the seat back is pivoted rearward so as to be brought into a full-flat state where the seat back is in a fully rearward reclined position, the seat back can be laid on the seat cushion of the rear seat. The forward and rearward reclined postures of the seat back can be maintained by causing the recliner devices to be locked.

When the seat back is pivoted rearward so as to be brought into the full-flat state and is laid on the seat cushion of the rear seat, the rearward relined posture of the seat back can be stably maintained even if a weight load of an occupant on the front seat is applied to the seat back. However, if the seat back of the front seat is pivoted rearward to such a degree that the seat back of the front seat is not laid on the seat cushion of the rear seat, the weight load of the occupant on the front seat which is applied to the seat back of the front seat is received by the recliner devices only. Similarly, in a second seat employed in an automobile in which a cargo space is provided in a rear section of the automobile and a third seat is not present rearward of the second seat, when a seat back of the second seat which is pivotally supported through recliner devices to a seat cushion of the second seat is pivoted rearward and a weight load of an occupant on the second seat is applied to the seat back of the second seat, the weight load is received by the recliner devices only.

It is therefore an object of the present invention to provide a reclining seat for an automobile, in which a rearward reclined posture of a seat back of the reclining seat can be stably maintained, with a simple structure, in a full-flat state to such a degree that the seat cushion is not laid on a seat back of a rear seat, or which is a second seat employed in an automobile in which a cargo space is provided in a rear section of the automobile and a third seat is not present rearward of the second seat, and in which a rearward reclined posture of a seat back of the second seat can be stably maintained in a full-flat state with the simple structure.

DISCLOSURE OF THE INVENTION

In accordance with the present invention, there is provided a reclining seat for an automobile, which comprises a seat back having first side brackets provided at both sides thereof, a seat cushion having second side brackets provided at both sides thereof, the second side brackets being arranged outside of the first side brackets so as to be opposite to the first side brackets, a connecting shaft inserted at both end portions thereof through the first and second side brackets and interconnecting the first and second side brackets, whereby the seat back pivotally supported to the seat cushion, recliner devices mounted on the connecting shaft and arranged between the first and second side brackets for allowing the seat back to be pivoted forward and rearward relative to the seat cushion in such a manner that an angle of the seat back relative to the seat cushion can be adjusted, and allowing the seat back to be locked with respect to the seat cushion, and stopper means on the first and second brackets for causing a rearward reclined posture of the seat back to be maintained in a full-flat state when the seat back is pivoted rearward relative to the seat cushion.

In the reclining seat for the automobile according to the present invention, the stopper means for causing a rearward reclined posture of the seat back to be maintained in the full-flat state is provided, so that the rearward reclined posture of the seat back can be stably maintained in the full-flat state by cooperation of the stopper means and the recliner devices. In addition, the stopper means is simple in structure, so that the stopper means can be easily provided without causing a basic structure of the seat to be changed, and the rearward reclined posture of the seat back can be stably maintained in the full-flat state with such simple stopper means in cooperation with the recliner devices.

In a preferred embodiment of the present invention, the stopper means comprises receiving pieces provided at the second side brackets so as to extend in spaces between the first and second side brackets, and abutting pieces projecting in the spaces from side surface portions of the first side brackets of the seat back, the receiving pieces and the abutting pieces being disposed at spaced locations on circles concentric with the connecting shaft.

In the reclining seat according to the embodiment of the present invention, the stopper means comprises the receiving pieces provided at the second side brackets so as to extend in the spaces between the first and second side brackets, and the abutting pieces projecting in the spaces from the side surface portions of the first side brackets of the seat back, so that the stopper means can be constructed as a simple structure which does not require changing of the basic structure of the seat.

BRIEF DESCRIPTION OF THE DRAWINGS

The above object and other objects and many of the attendant advantages of the present invention will be readily appreciated as the same becomes better understood by reference to the following detailed description when considered in connection with the accompanying drawings, in which like reference numerals designate like or corresponding parts throughout the Figures and wherein.

DETAILED DESCRIPTION OF THE PREFERRED EMBODIMENT

Figure 1:
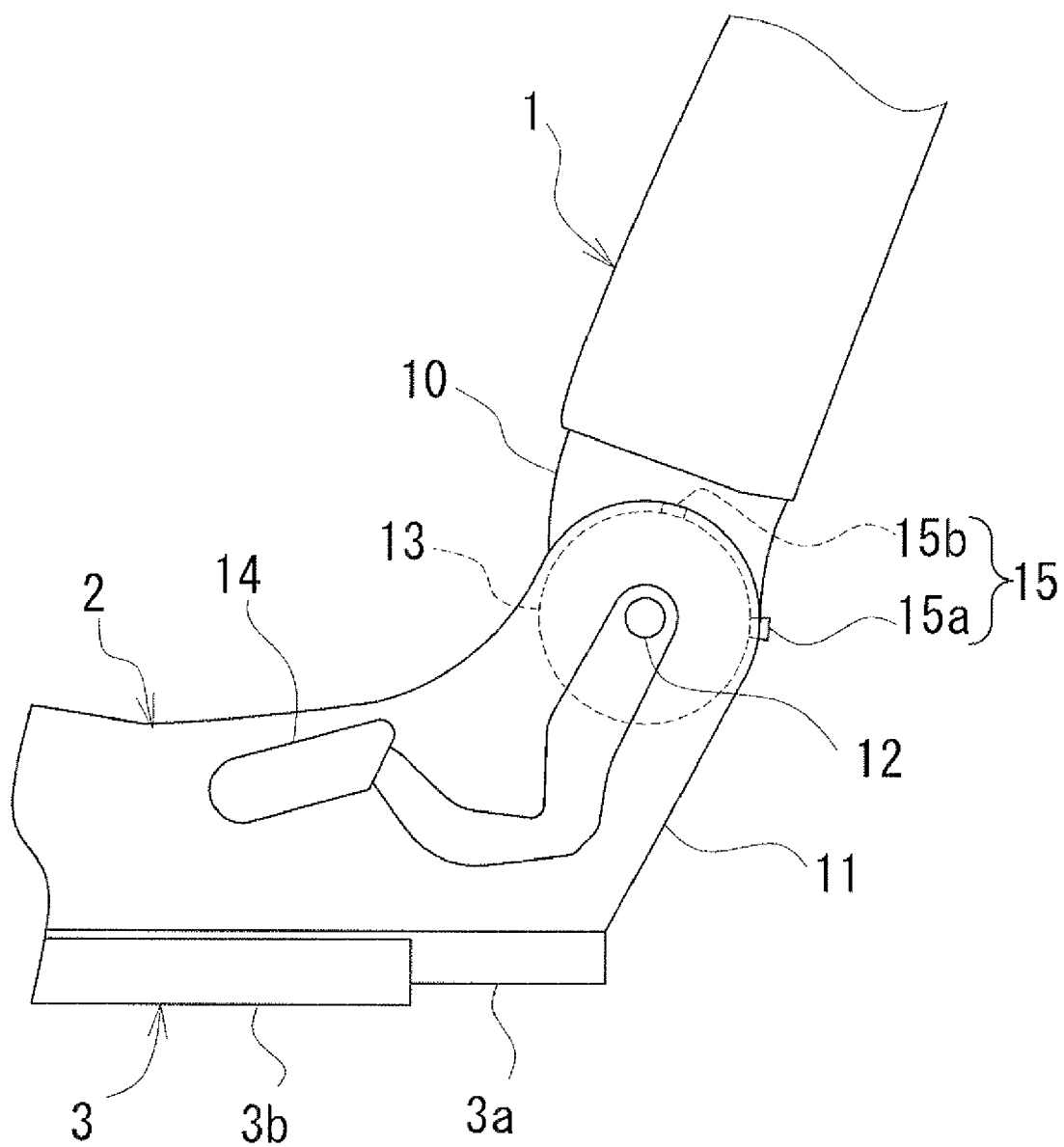
FIG. 1 is a schematic side view of a reclining seat for an automobile according to the present invention, in which portions of the reclining seat are omitted from illustration for the sake of brevity.

A reclining seat for an automobile according to an embodiment of the present invention will be discussed hereinafter with reference to the accompanying drawings. Referring to FIG. 1, the reclining seat according to the embodiment of the present invention comprises a seat cushion 2, a seat back 1 provided with a headrest (not shown) and pivotally supported through recliner devices 13 (only one recliner device 13 is shown in FIG. 1) to a rear portion of the seat cushion 2 so as to be pivoted forward and rearward relative to the seat cushion 2, and a slide rail mechanism 3 for allowing the entire seat to be moved forward and rearward in the automobile. The slide rail mechanism 3 comprises a pair of spaced apart stationary rail members 3b (only one stationary rail member 3b is shown in FIG. 1) mounted on an automobile floor, and a pair of spaced apart movable rail members 3a (only one movable rail member 3a is shown in FIG. 1) mounted to a lower portion of the seat cushion 2 and slidably engaged with the stationary rail members 3b. Incidentally, in FIG. 1, an upper portion of the seat back 1 which includes the headrest, a forward portion of the seat cushion 2 and a forward portion of the slide rail mechanism 3 are omitted from illustration for the sake of brevity.

The seat back 1 is provided at both sides thereof with side brackets 10 (only one side bracket 10 is shown in FIG. 1). Similarly, the seat cushion 2 is provided at both sides thereof with side brackets 11 (only one side bracket 11 is shown in FIG. 1).

The seat back 1 is pivotally supported to the seat cushion 2 by a connecting shaft 12 with the side brackets 10 thereof being disposed inside the side brackets 11 of the seat cushion 2 and opposite to the side brackets 11 of the seat cushion. Moreover, the connecting shaft 12 is inserted at both end portions thereof through the side brackets 10, 11 and the recliner devices 13 are mounted on the connecting shaft 12 and arranged between the side brackets 10 and the side brackets 11. Thus, the seat back 1 can be pivoted forward and rearward relative to the seat cushion 2 and can be locked in a predetermined position with respect to the seat cushion by the recliner devices 13. In addition, an operating lever 14 for causing the recliner devices 13 to be unlocked, and coil springs or torsion springs (not shown) for causing the seat back 1 to be urged in such a direction as to be pivoted forward are provided.

In the automobile seat constructed as discussed above, stopper means for causing the seat back 1 to be maintained in a full-flat state where the seat back is in a fully rearward reclined position but is not laid on a seat cushion of a rear seat arranged immediately rearward of the automobile seat according to the present invention is provided. The stopper means comprises receiving pieces 15a and abutting pieces 15b (only one receiving piece 15a and only one abutting piece 15b are shown in FIG. 1). As will be discussed hereinafter, each of the receiving pieces 15a and each of the abutment pieces 15b are provided so as to be arranged between a corresponding side bracket 10 of the seat back 1 and a corresponding side bracket 11 of the seat cushion 2.

Figure 2:
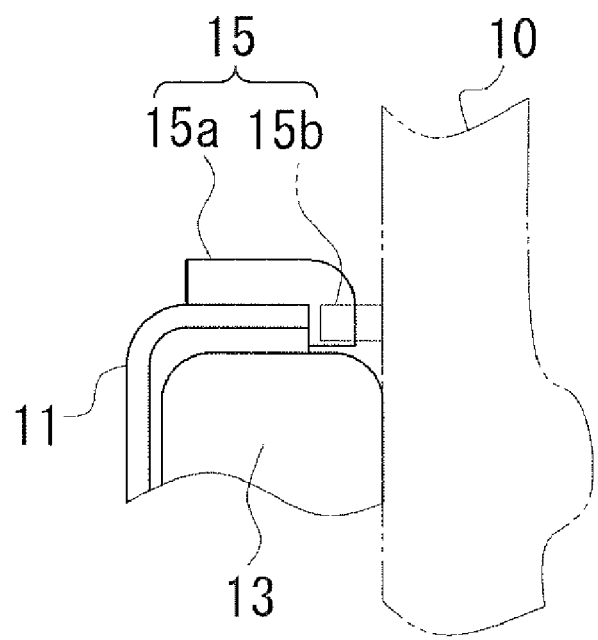
FIG. 2 is a schematic fragmentary plan view which mainly illustrates a receiving piece of stopper means provided at the reclining seat of FIG. 1.

Referring to FIG. 2, the receiving piece 15a is formed into a substantially L-shape and fixed, by welding, to a rear edge of an inwardly bent flange (not shown) provided at a rear edge of the corresponding side bracket 11 of the seat cushion 2. More particularly, the receiving piece 15a extends from the rear edge of the inwardly bent flange of the seat cushion 2 into a space between the side bracket 11 of the seat cushion and the corresponding side bracket 10 of the seat back 1.

Figure 3:
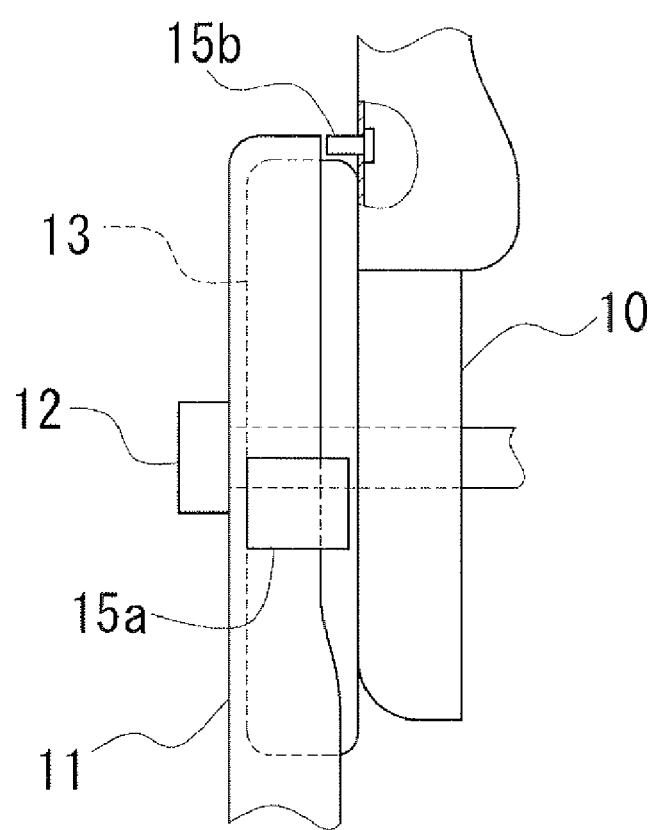
FIG. 3 is a schematic fragmentary rear view which mainly shows an abutting piece of the stopper means provided at the reclining seat of FIG. 1.
Figure 4:
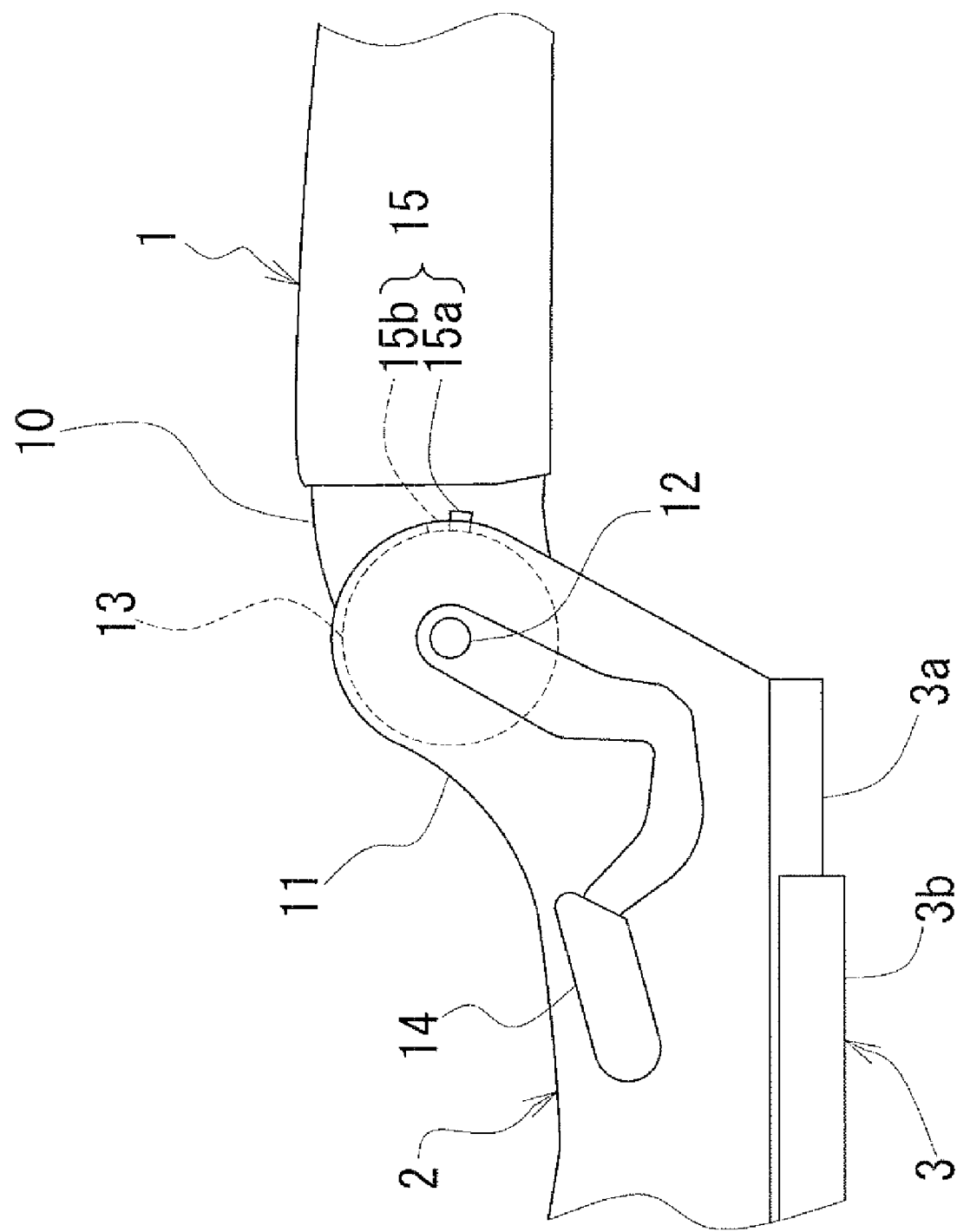
FIG. 4 is a schematic side view of the reclining seat of FIG. 1 which is of assistance in explaining a condition where a seat back of the reclining seat is pivoted rearward.

Referring to FIG. 3, the abutting piece 15b is formed into a substantially strip-shape, fitted through a through-hole formed in a side surface portion of the corresponding side bracket 10 of the seat back 1, so as to project in the space between the side bracket 10 of the seat back 1 and the corresponding side bracket 11 of the seat cushion 2, and fixed to the side surface portion of the side bracket 10 of the seat back 1 by welding. The receiving piece 15a and the abutting piece 15b are provided so as to be disposed at spaced locations on a circle concentric with the connecting shaft 12.

In the automobile seat constructed as discussed above, when the recliner devices 13 are unlocked and the seat back 1 is pivoted rearward relative to the seat cushion 2 so as to be brought into the full-flat state, the abutting pieces 15b provided at the seat back 1 are abutted against the receiving pieces 15a. In this condition, when the recliner devices 13 are locked, to thereby cause the seat back 1 to be locked relative to the seat cushion 2, even if the weight load of the occupant on the seat is applied to the seat back 1, the rearward reclined posture of the seat back 1 can be stably maintained by cooperation of the recliner devices 13 and the stopper means 15.

Thus, even if the seat back 1 is pivoted rearward to such a degree that the seat back 1 is not laid on the seat cushion of the rear seat, the rearward reclined posture of the seat back 1 can be stably maintained in the full-flat state. The present invention may be applied to a second seat employed in an automobile in which a cargo space is provided in a rear section of the automobile and a third seat is not present rearward of the second seat. In this case, even if a seat back of the second seat is pivoted rearward so as to be brought into the full-flat state, the rearward reclined posture of the seat back of the second seat can be also stably maintained in the full-flat sate.

The stopper means 15 comprises the receiving pieces 16a fixed to the side brackets 11 of the seat cushion 2 by welding, and the abutting pieces 15b fixed to the side brackets 10 of the seat back 1. Therefore, by such simple stopper means 15 which can be easily provided at the automobile seat without causing the basic structure of the seat to be changed, the seat back 1 can be stably maintained in the full-flat state.

The terms and expressions which have been employed are used as terms of description and not of limitation, and there no intention in the use of such terms and expressions of excluding any equivalents of the features shown and described, or portions thereof, but it is recognized that various modifications are possible within the scope of the invention claimed.

What is claimed is:

1. A reclining seat for an automobile, comprising:
   a seat back having first side brackets provided at both sides thereof;
   a seat cushion having second side brackets provided at both sides thereof;
   said second side brackets being arranged outside of said first side brackets so as to be opposite to said first side brackets;
   a connecting shaft inserted at both end portions thereof through said first and second side brackets and interconnecting said first and second side brackets, whereby said seat back pivotally supported to said seat cushion;

recliner devices mounted on said connecting shaft and arranged between said first and second side brackets for allowing said seat back to be pivoted forward and rearward relative to said seat cushion in such a manner that an angle of said seat back relative to said seat cushion can be adjusted, and for allowing said seat back to be locked with respect to said seat cushion; and stopper means on said first and second side brackets for causing a rearward reclined posture of said seat back to be maintained in a full-flat state when said seat back is pivoted rearward relative to said seat cushion;

said stopper means comprising receiving pieces provided at said second side brackets so as to extend from said second side brackets in spaces between said first and second side brackets, and abutting pieces projecting in said spaces from side surface portions of said first side brackets of said seat back, said receiving pieces and said abutting pieces being disposed at spaced locations on circles concentric with said connecting shaft, so that when said seat back is unlocked with respect to said seat cushion by operating of said recliner devices and pivoted rearward relative to said seat cushion so as to become the full-flat state, said abutting pieces are operatively abutted against said receiving pieces and when said seat back in the condition of being abutted at said abutting pieces against said receiving pieces of said seat cushion is locked, at a position where said seat back becomes the full-flat state, with respect to said seat cushion by said recliner devices, said seat back can be stably maintained in the full-flat state by cooperation of said stopper means and said recliner devices.

\* \* \* \* \*